March 31, 1936.  J. H. H. VOSS  2,035,776

RING PLATE VALVE

Filed June 22, 1935

INVENTOR
Johann Heinrich Hermann Voss
BY
ATTORNEY

Patented Mar. 31, 1936

2,035,776

UNITED STATES PATENT OFFICE 2,035,776

RING PLATE VALVE

Johann Heinrich Hermann Voss,
White Plains, N. Y.

Application June 22, 1935, Serial No. 27,901

4 Claims. (Cl. 277—20)

This invention relates to improvements in automatic ring plate valves, as for instance described in my Patent No. 1,958,219, issued May 8, 1934, in which the moving valve plates consist of thin, flat, and individual ring plates which are held in closed position over circular ports in the valve seat by spring action and are opened by the flowing medium. In the well known valves of this type safety of operation is endangered through the loosening and breaking of bolts, nuts, clamps and other means holding the different portions together; furthermore, these fastenings reduce the effectiveness of the valve and the effective passage area by taking up much space within the structure of the valve, and, finally, the springs provided for closing pressure soon become ineffective and are, due to their shape, proportion and manner of mounting, subject to considerable wear and tear, either through excessive bending stresses, resulting in frequent breakages, or, due to high discharge temperatures, to early annealing, with consequent loss of elasticity, if made of lighter material.

A primary object of this invention is to simplify the valve design still further by avoiding costly turning and milling operations on the valve guard which is usually made in one piece with the guide lugs.

The valve plates require for their guidance over the seat a very accurate machining for the guide lugs which must be turned and milled and after these two machining operations they must be burred, that is, the sharp edges left from machining must be carefully filed and great pains must be taken that the corners of the guide lugs are sharp so that the valve plate in its open position lies flat against the abutment surfaces in the valve guard. It is also costly to heat-treat the entire valve guard so that the guide lugs are hard and resist wear for a reasonable length of time.

In order to avoid this high expense for machining and heat treating, and at the same time provide a better housing for the valve springs as shown in my above named patent, I provide, according to the present invention, guide lugs, which are made in one piece with a separate housing for the valve springs which straddle over two rings.

This new spring housing with its attached guide lugs is placed in cylindrical holes drilled in the valve guard between adjacent wall sections. In this manner I improve the spring action by providing a solid surface for the spring to rest on and at the same time provide guide lugs which can easily be made from high grade materials and separately heat treated and can be replaced at a comparatively small cost.

Other objects and advantages of my invention will become more fully known as the description thereof proceeds and will then be more specifically defined in the appended claims.

In the accompanying drawing forming a material part of this disclosure:

Figure 1:
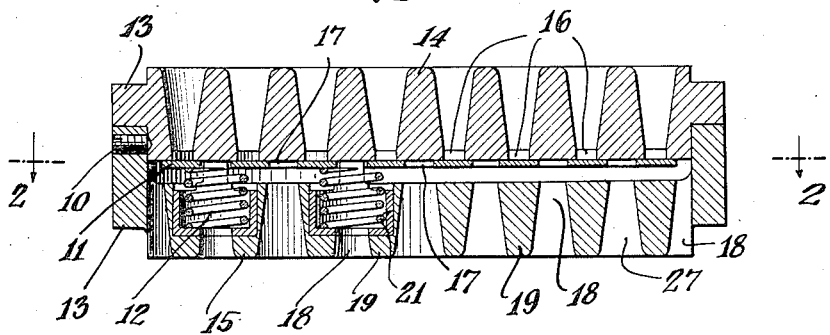
Fig. 1 is a central and sectional elevation of the improved ring plate valve, the section being taken on line 1—1 of Figure 2.
Figure 2:
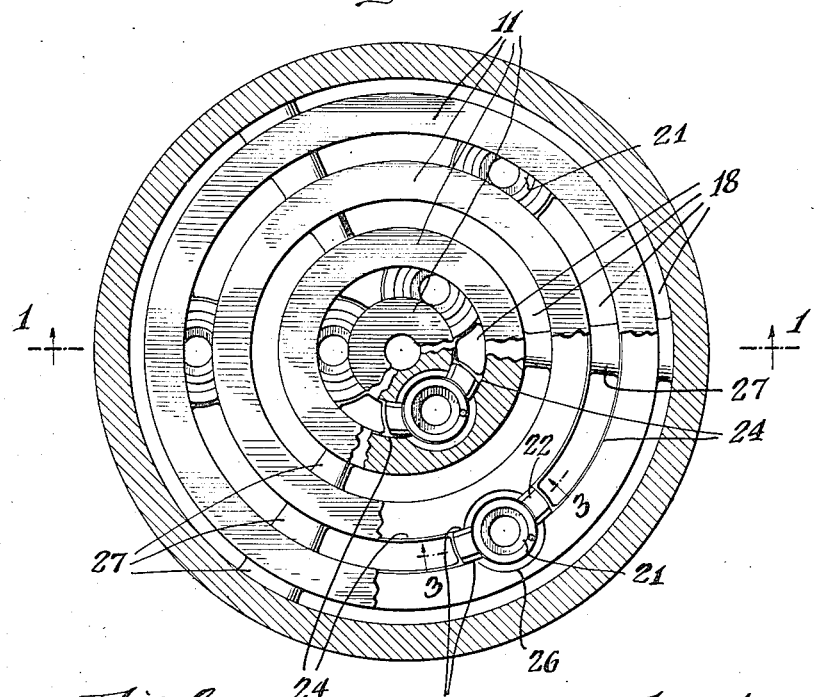
Figure 2 is a plan view of the valve seen along line 2—2 of Figure 1.
Figure 3:
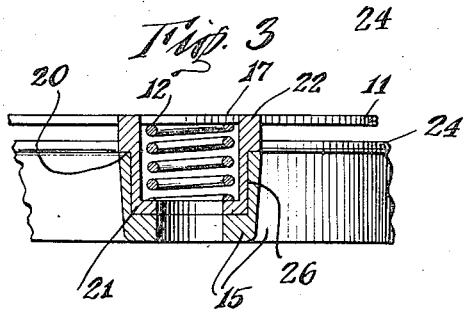
Fig. 3 is a section on line 3—3 of Figure 2.
Figures 4, 5:
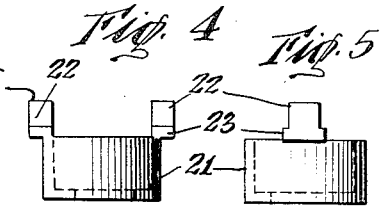
Fig. 4 is a detail front elevation of the spring housing with attached guide lugs.
Fig. 5 is a side elevation thereof.

As illustrated, the valve casing consists of two sections registering on their periphery in a rim and shoulder engagement secured with three or more set screws 10, with the valve plates 11 and their springs 12 housed between them and with appropriate external surfaces or collars 13 whereby the assembled parts may be clamped into the compressor structure. Both casing sections are, or may be, simple castings, the section marked 14 forming the valve seat and the other, marked 15, being the valve guard having ribs 27 connecting the circular wall sections 19.

For a multi-ported valve of the kind here shown the seating part 14 has a surface 17 with a plurality of concentrical circular port slots 16 of proper width suited to the circular contour of the structure.

The upper or inner ends of all these port slots terminate at the common seat surface 17 for the valve plates 11, which surface is a plane and hence easily produced in its finished form by ordinary tools. The valve guard section is formed with flow slots 18 similar in their concentrical arrangement to the port slots 16, but offset relatively thereto so that when the sections are united, the walls or ribs 19 between the said flow slots are disposed in a staggered position over the port slots 16.

The parts so far described are identical with those disclosed in my above mentioned patent. According to the present invention, the faces 20 of the guard 15 retain or hold a spring housing 21 with attached guide lugs 22 having shoulders 23 for locking the housing 21 and lugs 22 in their engaged position. The side surfaces 24 of the flow slots 18 are machined to receive the shoulders 23 to prevent rotation or turning of the spring housing 21 in its seat. The upper faces 25 of the lugs 22 just touch the seat surface 17. 26 are cylindrical holes in the valve guard 15.

The guide lugs 22 are made in one piece with the separate housing 21 for the springs 12 straddling over two of the rings 11. The spring housing 21 with its guide lugs is placed into cylindrical holes 26 in the guard surface 20 drilled in the valve guard 15 between the adjacent wall sections and by means of the shoulders 23 lock the spring housing 21 and guide lugs 22 in their relative positions, so that the valve plates 11 are securely held in place over their portholes 16.

It will be noted that by the provision of the guide lugs made in one piece with the separate spring housing for the valve springs which straddle over two rings, I avoid the high expense for machining and heat treating while simultaneously providing a better housing for the valve springs as shown in the above mentioned patent. This new spring housing with its attached guide lugs is placed in the cylindrical holes drilled in the valve guard between adjacent wall sections so that the spring action is greatly improved by providing a solid surface for the spring to rest on and at the same time the guide lugs which can easily be made from high grade materials and separately heat treated and which can be replaced at comparatively small cost, are provided with the shoulders for locking the spring housing and lugs in their relative positions to form a secure guide for the valve plates over their respective ports.

It will be understood that I have described and shown the preferred form of my invention as one example only of the many possible ways to practically construct the same, and that I may make such changes in the general arrangement and in the minor details of my invention as come within the scope of the appended claims without departure from the spirit of my invention and the principles involved.

Having thus described my invention, what I claim as new and desire to secure by Letters Patent is:

1. In ring plate valves, including their united seat and guard sections, valve plates between said seat and guard sections, spring housings straddling over two rings and seated in depressions in the guard section, springs in said housings, and means formed with said housings to guide the valve plates or rings over their ports in the seat section, and to prevent displacement of the spring housings in their seats.

2. In ring plate valves including their united seat and guard sections, valve plates confined between said seat and guard sections, said guard section having a depression formed therein, spring housings straddling over two rings and seated in the depressions of said guard section, springs in said housing, guide lugs formed with said housings guiding the same in said depressions, and guiding the valve plates or rings over their ports in the seat section, and means formed with said lugs engaging the flow slots of the guard section to lock said housings in their positions within the depressions of the guard section.

3. In ring plate valves including their united seat and guard sections, valve plates confined between said seat and guard sections, said guard section having depressions formed therein and flow slots, spring housings straddling over two adjacent rings and seated in the depressions of said guard section, springs in said housing, guide lugs formed with said housings for guiding the same in said depressions and for guiding the valve plates or rings over their ports in the seat section and shoulders formed on said lugs engaging the side surfaces of said flow slots to lock said housings in their positions within the depressions of the guard section.

4. In ring plate valves including their united seat and guard sections, valve plates between said sections, housings in depressions of said guard sections having flat bottom faces, springs seated in said housings resting on said faces, lugs formed with said housings to guide the valve plates or rings over their ports in the seat section and shoulders formed on said lugs to seat and lock the spring housings against rotation and turning, the upper faces of said lugs just touching the seat surface of the seat section.

JOHANN H. H. VOSS.